UNITED STATES PATENT OFFICE.

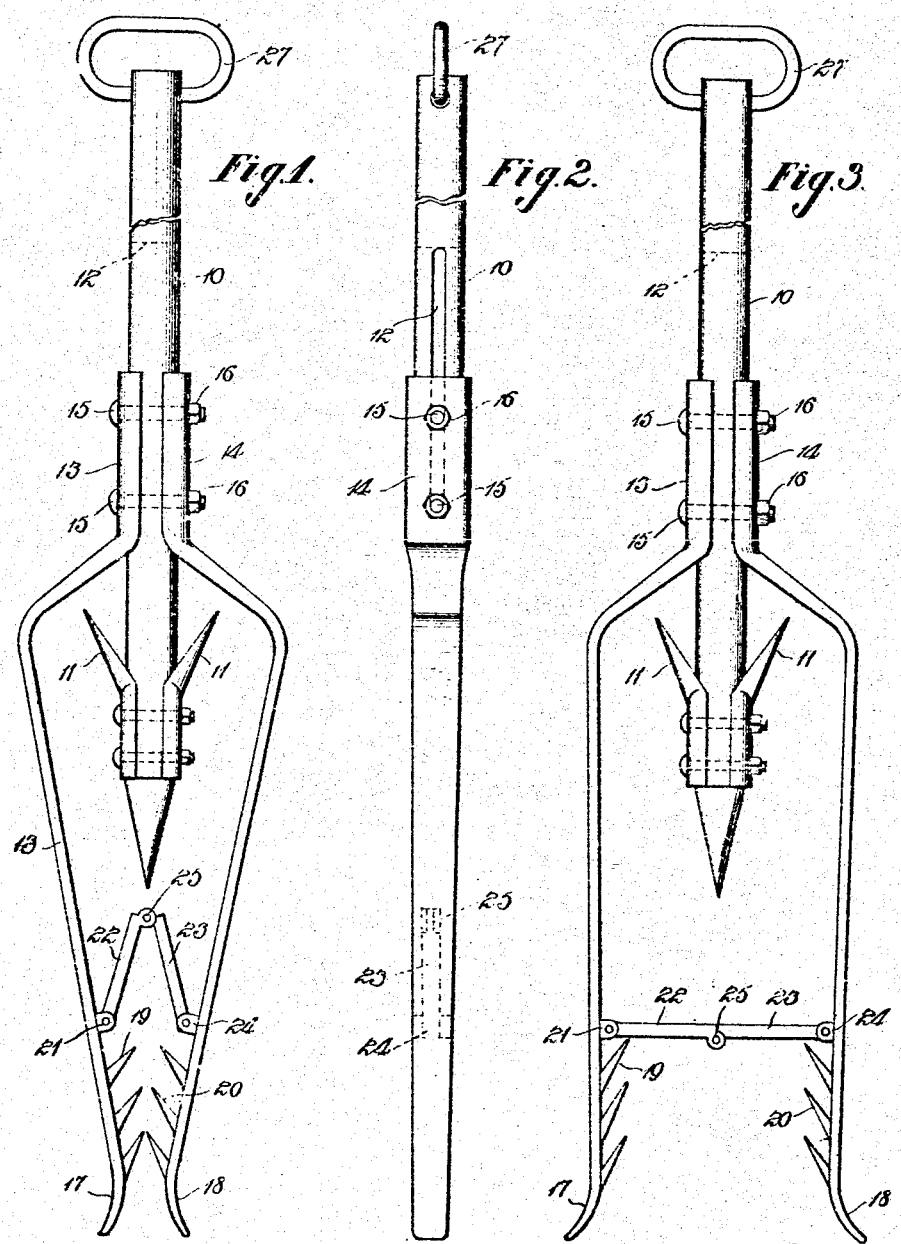

EDWARD D. COOGAN, OF RATCLIFF, ARKANSAS.

GRAPPLE.

972,340.

Specification of Letters Patent. Patented Oct. 11, 1910.

Application filed March 28, 1910. Serial No. 551,965.

*To all whom it may concern:*

Be it known that I, EDWARD D. COOGAN, a citizen of the United States, residing at Ratcliff, in the county of Logan, State of Arkansas, have invented certain new and useful Improvements in Grapples; and I do hereby declare the following to be a full, clear, and exact description of the invention, such as will enable others skilled in the art to which it appertains to make and use the same.

This invention relates to improvements in grapples, more particularly to devices of this character employed for removing tubes from wells, and for like purposes, and has for one of its objects to improve the construction and increase the efficiency and utility of devices of this character.

With this and other objects in view, the invention consists in certain novel features of construction as hereinafter shown and described and then specifically pointed out in the claim; and, in the drawings illustrative of the preferred embodiment of the invention, Figure 1 is a front elevation of the improved device in closed position, Fig. 2 is a side elevation of the same, Fig. 3 is a front elevation with the improved device in open position.

The improved device comprises a stock 10, of any suitable size and of any suitable material, and is provided at its lower end with laterally extending barbs 11 and with a longitudinal transverse slot 12 spaced above the barbed terminal. A hoisting ring 27 is connected to the upper end of the stock, as shown. Bearing upon opposite sides of the stock 10 and over the slot 12 are two resilient arms 13—14, and secured in position by clamp bolts 15 extending through the arms and likewise through the slot and provided with clamp nuts 16. By this means the arms may be adjusted longitudinally of the stock within the range of the slot or detached when the barbed portions 11 are to be employed, the object to be hereinafter explained.

The arms 13—14 are bent into the form shown and will be retained normally in closed position by their resiliency, or with their free ends in close proximity as shown in Fig. 1. At their lower ends the arms 13—14 are curved outwardly as shown at 17—18 and are likewise provided respectively with a plurality of inwardly directed and upwardly inclined teeth or barbs 19—20.

Pivoted at 21 to the arm 13 is a stop lever 22, while a similar stop lever 23 is pivoted at 24 to the arm 14. The inner ends of the members 22—23 are pivoted together as shown at 25, this pivot being in the form of a "rule-joint" as shown, so that the members 22—23 are free to be moved upwardly but will not move downwardly beyond a certain predetermined point, preferably when the members 22—23 are in longitudinal alinement as shown in Fig. 1. When in this position the members 22—23 serve as a jointed brace to maintain the members 13—14 in their separated or distended position, as shown in Fig. 3, and then when the members 22—23 are moved upwardly, the resiliency of the arms 13—14 will cause them to move inwardly toward each other, as shown in Fig. 1. A device thus constructed forms an effectual and convenient implement for grappling objects of any size within the range of the arms 13—14 when distended, but is designed, as before stated, for use more particularly for grappling well tubes or similar objects which have been lost in the bottom of a well.

When required for use the members 22—23 are set manually as shown in Fig. 3, to maintain the arms 13—14 in their distended position. The implement is then lowered into the well and the separated barbed portions of the arms pass upon opposite sides of the tube, and when the jointed members 22—23 engage the tube they are moved upwardly by the impact and thus "trip" the device and permit the barbs 19—20 to engage against the sides of the tube, and then when upward force is applied to the stock 10 by the pull ring 27 the barbs will hold the tube and carry it upward out of the well. The barbs being pointed upwardly from opposite sides serve as effectual grappling members for the device, and prevent the tube from becoming disengaged until released manually after the removal has been accomplished.

It frequently happens that rubbish of various kinds accumulates in the bottoms of wells, and it is difficult to reach the tube by reason of this rubbish, and the barbed portions 11 upon the stock 10 forms an effectual implement for accomplishing this result, and when occasion arises for employing the barbs 11—12 one of the clamp bolts 15 is removed and the other one loosened to enable the arms 13—14 to be turned upwardly out of the way of the barbed terminal 11 so that the latter may be employed for breaking up the accumulations of material at the bottom of the well, as above noted. The improved implement is thus capable of accomplishing all the work necessary to remove the tubes, and does not require the employment of a separate and distinct implement for different parts of the work.

The improved implement is simple in construction, can be inexpensively manufactured and of any required size and of any suitable material.

What is claimed is:—

In a grapple the combination with a pole, of oppositely disposed spring arms connected at one end to the pole and extending below the lower end of the same and having their free ends inclined outwardly and away from each other, said arms having inwardly directed spurs, two bars hingedly united at their outer ends respectively to said spring arms and hingedly united at their inner ends, the joint which unites the free ends of the bars being arranged to lock the same when the bars are in longitudinally alined position.

In testimony whereof, I affix my signature, in presence of two witnesses.

EDWARD X D. COOGAN.
his mark

Witnesses:
C. M. WATSON,
W. C. HILL.